H. S. HATFIELD.
GLASS TUBING.
APPLICATION FILED MAR. 18, 1911.

1,094,438.

Patented Apr. 28, 1914.

Witnesses:
Paul Krüger
Richard Hahn

Inventor:
Henry Stafford Hatfield

UNITED STATES PATENT OFFICE.

HENRY STAFFORD HATFIELD, OF JENA, GERMANY, ASSIGNOR TO THE FIRM OF SCHOTT & GEN., OF JENA, GERMANY.

GLASS TUBING.

1,094,438. Specification of Letters Patent. Patented Apr. 28, 1914.

Application filed March 18, 1911. Serial No. 615,364.

*To all whom it may concern:*

Be it known that I, HENRY STAFFORD HATFIELD, a citizen of Great Britain, residing at Otto-Schott strasse, Jena, in the Grand Duchy of Saxe-Weimar, Germany, have invented a new and useful Glass Tubing, of which the following is a specification.

The invention relates to glass tubing, which is suitable for being worked up into tubular members of measuring appliances and the like containing a liquid. Its object is to facilitate the flow of the liquid in such members.

More particularly the invention relates to such tubular members as are to be made of glass tubing, are closed at their bottom end and are intended for the reception of a non-wetting liquid (*e. g.* mercury), which is to be measured, together with a gas (*e. g.* air) or a wetting liquid (*e. g.* water). As an example of such members the measuring tubes of electrolytic electricity meters may be mentioned, in which mercury is used as an electrode. The invention permits of the adoption for such members of a quite small bore, whereby the accuracy, with which the non-wetting liquid may be measured, is correspondingly enhanced. To make the adoption of such a small bore possible, the glass tubing according to the present invention is furnished with inner longitudinal grooving passing right through it, in order to allow the wetting liquid or the gas to flow along the grooving in one direction and the non-wetting liquid to flow along the bore of the tubing in the opposite direction. The diameter of the bore of the tubing and the width of the grooving must be chosen in such a manner that, on the tubing being dipped into mercury, the latter will enter the tubing, while the meniscus-shaped head of the mercury does not reach to the bottom of the grooving on account of the surface tension, the wetting liquid or the gas filling that part of the grooving thus left free.

Figure 1:
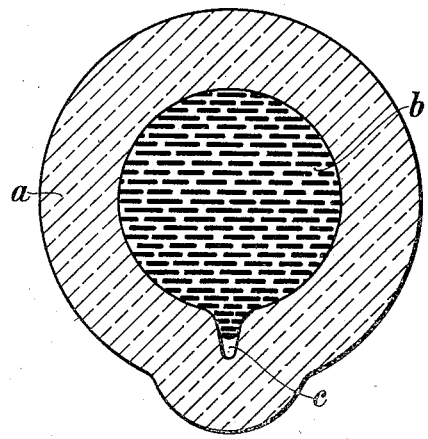
Figure 2:
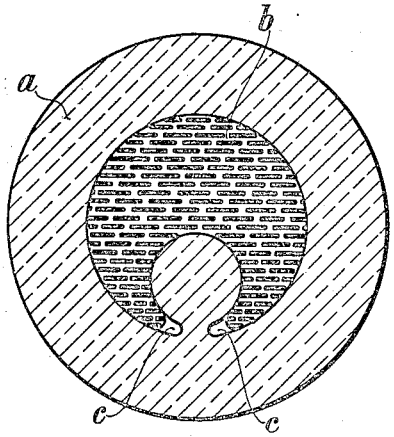
Figure 3:
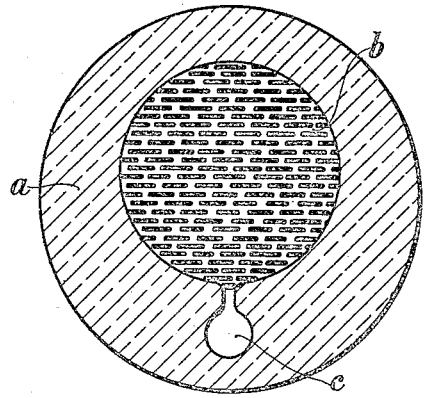
Figure 4:
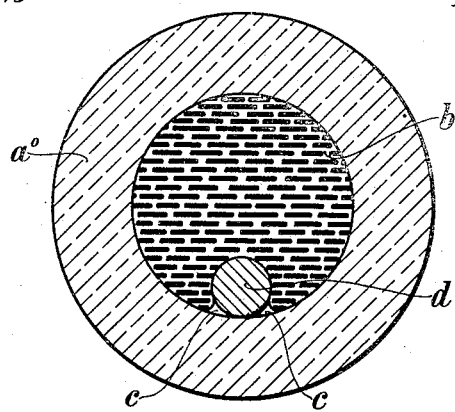

In the annexed drawing: Figure 1 is a cross-section through glass tubing with a profile formed according to the invention. Fig. 2 is a cross-section through glass tubing with another profile formed according to the invention. Fig. 3 is a cross-section through glass tubing with a third profile formed according to the invention. Fig. 4 is a cross-section through tubing composed of glass and metal with a profile formed according to the invention.

In Fig. 1 $a$ is the glass tubing according to the invention, the shading $b$ shows, how far the rounded head of the mercury would reach, when the tubing is dipped into the mercury, $c$ is a groove, which is either formed when the tubing is being drawn, or may be ground in subsequently. According to Fig. 2 an inner profile with two grooves $c$ has been formed, when the tubing was being drawn. In Fig. 3 the profile again shows a groove $c$ of a somewhat different form from that of the first example. The fourth example shows two grooves $c$. In this case a wire $d$ of non-amalgamating metal, *e. g.* iron, is longitudinally fused to the inner surface of ordinary glass tubing $a^0$, in order to produce the grooves.

I claim:

1. Glass tubing grooved internally in the longitudinal direction and intended for the reception of mercury along with a wetting liquid, the bore of the said tubing being so large and the grooving so narrow that, on the tubing being dipped into the mercury the latter enters the said bore, while its meniscus-shaped head does not reach to the bottom of the grooving.

2. Glass tubing having two inner longitudinal grooves formed by a non-amalgamating metal wire being longitudinally fused to its inner surface, which tubing is intended for the reception of mercury along with a wetting liquid, the bore of the said tubing being so large and the said grooves so narrow that, on the tubing being dipped into the mercury, the latter enters the said bore, while its meniscus-shaped head does not reach to the bottom of the grooves.

HENRY STAFFORD HATFIELD.

Witnesses:
  PAUL KRÜGER,
  RICHARD HAHN.